(12) United States Patent
Filo et al.

(10) Patent No.: US 7,565,063 B2
(45) Date of Patent: Jul. 21, 2009

(54) MEDIA FORMATTING AND SYSTEM FOR INTERACTIVE GAME PROGRAMMING

(75) Inventors: Andrew S. Filo, Cupertino, CA (US); David G. Capper, Novato, CA (US); Kent Suzuki, Oakland, CA (US)

(73) Assignee: Hasbro, Inc., Pawtucket, RI (US)

( * ) Notice: Subject to any disclaimer, the term of this patent is extended or adjusted under 35 U.S.C. 154(b) by 762 days.

(21) Appl. No.: 11/240,824

(22) Filed: Sep. 30, 2005

(65) Prior Publication Data

US 2006/0024034 A1 Feb. 2, 2006

Related U.S. Application Data

(63) Continuation-in-part of application No. 10/623,340, filed on Jul. 18, 2003, now Pat. No. 7,457,531.

(60) Provisional application No. 60/418,874, filed on Oct. 16, 2002.

(51) Int. Cl.
*H04N 5/91* (2006.01)
*H04N 5/00* (2006.01)
(52) U.S. Cl. .................................. 386/125; 386/68
(58) Field of Classification Search ................ 386/125, 386/107, 117, 46, 109, 111, 112, 68, 69, 386/67
See application file for complete search history.

(56) References Cited

U.S. PATENT DOCUMENTS

| | | |
|---|---|---|
| 3,855,426 A | 12/1974 | Bouwhuis |
| 3,962,721 A | 6/1976 | de Haan |
| 4,018,987 A | 4/1977 | Keizer |
| 4,227,213 A | 10/1980 | Isobe |
| 4,322,759 A | 3/1982 | Zenzefilis |
| 4,523,304 A | 6/1985 | Satoh et al. |
| 4,527,264 A | 7/1985 | d'Alayer de Costemore d'Arc |
| 4,695,953 A | 9/1987 | Blair et al. |
| 5,214,514 A | 5/1993 | Haberkern |
| 5,377,051 A * | 12/1994 | Lane et al. ................ 386/81 |
| 5,408,331 A | 4/1995 | Ota |
| 5,448,372 A | 9/1995 | Axman et al. |
| 5,526,134 A | 6/1996 | Furuki et al. |
| 5,887,108 A | 3/1999 | Park |
| 5,914,706 A | 6/1999 | Kono |
| 5,914,707 A | 6/1999 | Kono |
| 5,956,310 A | 9/1999 | d'Alayer de Costemore d'Arc |
| 6,018,613 A | 1/2000 | Ota et al. |
| 6,169,847 B1 | 1/2001 | Mizoguchi et al. |
| 6,374,040 B2 | 4/2002 | Mizoguchi et al. |

(Continued)

*Primary Examiner*—Robert Chevalier
(74) *Attorney, Agent, or Firm*—Perry Hoffman (57) ABSTRACT

A video game system including a compact disc programmed with video and audio data and designed to continuously update a player device with informational data to facilitate dynamic sequencing of video tracks during video game play. A unique uncomplicated development methodology is disclosed for the format information on the disc and the programming of the player device providing advantages of achieving strategic video gaming and fast action gaming, exclusively from the manipulation of a user's input during play via six operable navigational buttons. The navigational buttons thus affect the player device selection of video tracks through format information added to image frames of the disc. Numerous benefits are provided including the use of high quality video images and DVD style gaming applications in a low cost system which utilizes inexpensive standard disc media, such game discs are developed at substantially reduced programming cost relative to other game programming technologies.

24 Claims, 6 Drawing Sheets

U.S. PATENT DOCUMENTS

| | | |
|---|---|---|
| 6,445,878 B1 | 9/2002 | Kato et al. |
| 2001/0004310 A1 | 6/2001 | Kono |
| 2001/0016114 A1 | 8/2001 | Van Gestel et al. |
| 2002/0131759 A1 | 9/2002 | Lakhansingh |
| 2002/0136540 A1 | 9/2002 | Adams et al. |

* cited by examiner

Thumbnail 1

FIG. 3A

Thumbnail 2

FIG. 3B

Question 1

MEDIA FORMATTING AND SYSTEM FOR INTERACTIVE GAME PROGRAMMING

CROSS-REFERENCE TO RELATED APPLICATION

This application is a continuation-in-part of U.S. application Ser. No. 10/623,340, filed Jul. 18, 2003 now U.S. Pat. No. 7,457,531, which claims priority pursuant to 35 USC 119(e) to U.S. Provisional Application No. 60/418,874, filed on Oct. 16, 2002 both of which are incorporated herein by reference in their entirety.

BACKGROUND OF THE INVENTION

1. Field of the Invention

The present invention relates to systems and methods for sound and image production with video game programming instruction and content formatted media including digital audio data on compact discs ("CDs") and the like for recording and reproducing interactive information. More particularly, the invention relates to interactive game programming for playback responsive to user inputs.

2. Description of the Related Art

Various types of CDs exist for recording and reproducing applications including those where one or more types of data are recorded for reproduction. Some commercially available CD types include a compact disc digital audio ("CD-DA"), a compact disc read only memory ("CD-ROM"), compact disc interactive ("CD-I"), and a video CD or a digital versatile disk ("DVD"). The CD-DA is known for use as a storage medium for audio that is converted into digital code by sampling the sound waves at 44.1 kHz and converting samples into a 16-bit number. In addition, a blank or recordable compact disk may be referred to as a "CD-R." In some applications a CD-ROM format is used to store text, graphics, and audio information. The CD-ROM storage format is different from that of a CD-DA and a CD-DA player cannot play CD-ROMs. In applications where full-motion is recorded, a video CD format may be used for recording VHS-quality video and CD-quality audio. Video CD movies are compressed using the MPEG-1 method and require a motion picture experts group ("MPEG") decoder for playback. The CD-I format is used to store data, audio, still video, or animated graphics. CD-Is include an operating system standard and methods for compressing the data such that video images may be displayed. A CD-I requires a CD-I player for reproduction of stored information and cannot be played on, for example, a CD-DA player.

With the above-noted compact disc technology in existence, systems have been developed for recording and reproducing audio and video information. One video signal recording system described in U.S. Pat. No. 4,227,213 to Isobe for a "Video Signal Recording System" issued on Oct. 7, 1980, relates to recording a stationary image signal and an audio signal on a common video disc. In this system, video frames representing stationary images are recorded such that frame, or image, starting points are located on a common radial line of the video disc. The audio signal associated with the stationary image is time compressed and recorded in equal sized portions at predetermined intervals, and in-between portions of the video frame. In this manner, a frame for a stationary image and the associated audio signal is recorded in approximately two video frames worth of video disc space. The reproduction of the audio and video data is thus provided by audio expansion and video delay circuitry.

In other systems, a CD-I may be used as a medium for recording video, text, program, and audio information. These systems typically include a reproducing device that operates interactively with the user for playing back the stored information. However, these systems are often uneconomical for use as entertainment devices for children due to excessive hardware costs for accessing and processing the interactive program data and compressed video information on the CD-I. In addition, CD-I discs will not play in a CD-DA player. A system described in U.S. Pat. No. 6,445,878 to Kato et al. for a "Disc Recorded With Audio, Image, And Operation Image Data From Which Sound And Images Can Be Reproduced And Apparatus For Reproducing Sound And Images From Such Disc" issued on Sep. 3, 2002, relates to a CD-I disc having recorded sound and image information along with program and operation image data. The disclosed reproducing apparatus reproduces information stored on a CD-I, a CD-I/CD-DA, and a CD-DA. The CD-I/CD-DA disc includes CD-I tracks mixed with CD-DA tracks. The data format used for recording the sound and image information along with program and operation image data includes mixed "form 1" and "form 2" data structures corresponding to "mode 1" and "mode 2" formats of a CD-ROM. The "form 1" and "form 2" formats for the CD-I also employ video compression and a sub-header having blocks on which recorded sound, picture, and data are time-division-multiplexed. The sub-header is composed of the file number, channel number, sub-mode, and data type. The audio information is written in the CD-I as either 16-bit pulse code modulated ("PCM") data sampled at 44.1 kHz, 8-bit or 4-bit adaptive differential pulse code modulation ("ADPCM") sampled at 37.8 kHz, or 4-bit ADPCM sampled at 18.9 kHz. The video data is compressed from 8-bit data to 4-bit data for recording and then expanded back to 8-bit data during reproduction. A central processing unit ("CPU") controls the CD-I system and, along with components including a system controller, master controller, and CD-ROM producing circuit, audio, video, and operation image data is processed and presented to the user according to program data stored on the CD-I or CD-I-CD-DA. Further, a CD-RTOS (real time operating system) handles files stored in a read only memory ("ROM") provided as part of the system.

Another system disclosed in U.S. Pat. No. 5,408,331 to Ota for an "Optical Disc Reproducing Apparatus Having Selectable Processing Speeds" issued on Apr. 18, 1995, relates to an optical disc reproducing apparatus for CD-I in which information such video information, computer data, application programs are recorded in addition to audio information. The apparatus includes voice signal processing for decoding ADPCM audio data and picture signal processing with two channels of video signal processing circuits for picture superposition and switching. A controller includes a microcomputer ("MCPU"), a master controller for decoding addresses from the MCPU and controlling direct memory accessing ("DMA"), and a CD-RTOS stored in ROM. In addition, the system includes a small computer system interface (SCSI) for exchanging data or commands with, for example, a host computer via data input/output terminal, a crystal oscillator for supplying a clock signal to the MCPU. A frequency divider divides the clock signal from the crystal oscillator and a changeover switch selects one of multiple clock signals with different frequencies and supplies the selected clock signal to the MCPU, which allows a user to varying the program execution speed. Other systems are known, including those disclosed in U.S. Pat. No. 5,914,706 to Kono for a "Compact Portable Audio-Display Electronic Apparatus With Interactive Inquirable And Inquisitorial Interfacing" issued on Jun. 22, 1999, and U.S. Pat. No. 5,914,707 to Kono for a "Compact Portable Audio/Display Electronic Apparatus With Interactive Inquirable And Inquisitorial Interfacing" issued on Jun. 22, 1999. These above-noted patents disclose an apparatus where audio and video information is recorded for reproduction on a portable device. However, these systems are employed to provide interfacing with video data stored as CD-I or CD-ROM formatted data and not with video data formatted for storage on CD-DA. In addition, DVDs and players, such as those described in U.S. Pat. Nos. 6,169,847 and 6,347,040 both to Mizoguchi et al. for a "Portable DVD Player" respectively issued on Jan. 2, 2001 and Apr. 16, 2002 disclose a DVD players employed for high capacity media recording and reproduction using multi-layer disc and MPEG compression technology. MPEG compression is a lossy compression method in which some of the original image is lost, using intraframe coding for individual frames, but also used interframe coding, which further compresses the video data by encoding only the differences between periodic key frames (known as I-frames). The disclosed players include a displaying and outputting mechanism mixing and displaying the main image decoded by an MPEG decoder and a sub image decoded by a sub-picture decoder. A voice outputting mechanism outputs voice regenerated by an audio decoder. Moreover, the players include a communications interface, PC card interface, and a universal serial bus ("USB") interface to encrypt data for output. Although such players may be used to reproduce audio and video information, the multi-layer disc recording and processing technology employed in DVD applications is fundamentally different from that used in CD-DA recorders and players.

Other systems that disclose features providing video disc program branching or other controls that interface with TV displays and like, include U.S. Pat. No. 4,695,953 to Blair et al. for "TV animation interactively controlled by the viewer" issued Sep. 22, 1987 which discloses animated actions of the user that switches the display to make the picture respond interactively for continuous action in a scene. The '953 patent discloses motion picture branching providing an animation method which enables rapid and repeated switching of multiple tracks of different camera-originated animation of the same character during continuous action in a scene, and enables branching at the termination of an action to multiple actions or scenes. This method is the basis of a double-circuit video system that enables a player to repeatedly touch or hit an animated character during a continuous action as displayed on a projection screen or television monitor and thus change the action repeatedly. A random number device may select one of the sixty to a hundred episodes of animation—in the preferred embodiment—and a rewind to the selected episode is affected. Thus the system of multiple scenes interactively switched by the action of the user and multiple episodes that may be determined by random choice, user action, or user choice creates such a complexity of graphic pattern and dramatic odds that the uncertainties of reality are simulated although the animation is pre-photographed, prerecorded, and programmed. Operation is described using film, video tape, video disc, or digital stored and/or generated animation. This enables branching at the termination of an action to multiple actions or scenes. It is likewise known to use DVD chapters which may contain information such as scripts, i.e., instructions readable and executable by a conventional DVD player. The DVD chapters may contain audio or video information which may play linearly or in any order or combination using scripts on the DVD to implement a series of instructions based on game variables and user-provided input to enable game play and scoring, etc. The use of variables and scripting within chapters described above may represent approach for certain DVD games. Further methods for playing an interactive DVD game include memory storage of the DVD player configured to accept input from an external input source and/or the user-operated control. Then defining a game variable, formatting the memory storage to hold a value associated with the game variable and changing the game variable as a function of the input accepted to select and play audiovisual content as a function of the value associated with the game variable and input accepted from an external input source or the user-operated control, which necessarily requires specific game scripting directed to using the player environment with data storage and handling capabilities.

While the above-noted systems are known, they are insufficient for use as economical and simple entertainment devices capable of "DVD style gaming". Compact discs having the same mechanical size as an ordinary compact disc for music (CD-DA) are disclosed for reproducing PCM audio from a CD-DA information, but only for music entertainment and not for video reproduction. Moreover, known systems do not record and reproduce interleaved bit map video and PCM audio information onto or from a CD-DA. Accordingly, there exists a need for a simple and efficient system that records audio and bit-map video information on a CD-DA and reproduces the information using a portable reproducing device.

SUMMARY OF THE INVENTION

In one embodiment of the invention, a disc player for interactive image display uses compact discs encoded with video content and format information producing "DVD style gaming" applications with audio tracks facilitating video program branching including jump chains and time windows, and interfaces with players that receive, process, and reproduce sound and/or images. The disc player includes a housing for receiving a standard compact disc, a display for showing images, and a plurality of navigational buttons for user input. The disc player also includes an optical disc reader for reading video and audio content information as well as format information from frame data structures encoded on a plurality of tracks on the disc. An information processor operable with the optical disc reader uses the content information to generate an image on the display. The information processor also utilizes a series of registers containing stored portions of format information from the frame data structures to provide jump chains associated with user input via the navigational buttons, and position a data acquisition track mechanism at a selected one of the plurality of tracks of the disc.

According to an embodiment of the invention, each frame data structure may contain various types of format information and technical data that can be read by the optical disc reader and utilized by the information processor. In a number of selected frame data structures the format information includes a table containing a series of addresses associating at least one of the plurality of navigational buttons with a track of the disc. Activation of a particular navigational button causes the information processor to direct the data acquisition track mechanism to jump to the track associated with that particular navigational button, rather than going to the next sequential track of the disc. Two or more tracks may be linked together to play one after each other just by activating one particular navigational button. The above scenario is true for each navigational button, creating a vast number of possible jump chain combinations which can be linked to each navigational button during playback of the track.

In an embodiment of the invention, the series of addresses from the table of selected frame data structures is repeatedly updated into the series of registers contained in the disc player as the disc is played. The link between a particular navigational button and a selected track of the disc is fixed only during playback of the entire current track, and not for playback of all the other tracks. The repeated updating of addresses to the player's register allows great flexibility to repeatedly change the association between the navigational buttons and a selected track allowing for varied game play.

In another embodiment of the invention, the disc player has multiple navigational buttons being associated through tables containing a series of addresses to a track on the disc. At least one track on the disc comprises two or more frame data structures having identical address information to ensure the accuracy of the updating of the registers of the disc player. The frame data structures with identical address information can consecutively upload the series of addresses to the player's register establishing a link between the navigational buttons and tracks on the disc with minimal error. In an embodiment, the table addresses may provide jump chains associated with each of the multiple navigational buttons associating one or more selected tracks to the navigational buttons.

In another embodiment of the invention, the table is not unique to the entire track as described above, but rather a track may contain a table with addresses information which changes as much as every frame of the track, creating time windows. This means that the navigational buttons can be linked to more than one track during playback of the current track creating dynamic game play, rather than fixing the jump chain for the entire track.

According to another embodiment of the invention, a method of formatting information on a disc for playback responsive to user navigational inputs includes encoding frame data structures on a plurality of tracks on the disc and providing content information and format information in the frame data structures. The content information is for the display of images associated with the plurality of tracks on the disc, and the format information defines jump chains associated with the user navigational inputs to select at least one of the plurality of tracks on the disc.

According to another embodiment of the invention, a disc playing method for selecting one of a plurality of track from the disc for displaying images on the disc player includes providing a plurality of navigational buttons on the disc player and encoding frame data structures on a plurality of tracks on the disc with content information and format information for the display of images associated with the content information. Storing format information on the disc player in a series of registers used to provide jump chains associated with each of the plurality of navigational buttons to select the track from the disc, and generating images associated with the selected one of the plurality of tracks from the disc.

Briefly summarized, the invention relates to a media playing system that receives a disc and has navigational buttons on its housing for interactive display via an information processor operable with the display and the optical disc reader for using content information for generating images. A data acquisition track mechanism positions the optical disc reader at a selected track on the disc, and a series of registers used by the information processor store selected portions of format information from frame data structures to provide jump chains associated with the navigational buttons. The series of registers are used by the information processor to position the data acquisition track mechanism at selected tracks for playback. The method of formatting information on the disc encodes frame data structures on tracks of the disc providing content information in the frame data structures for the display of images associated with one or more tracks on the disc. Additional format information is provided in the frame data structures to define jump chains associated with one or more of the user navigational inputs selecting tracks for playback. Images are generated from the content information of the frame data structures associated with the selected disc tracks. The format information of the frame data structures includes a table containing addresses associating at least one of the navigational buttons to a track on the disc, with tables containing the series of addresses changing with subsequent frames to create time windows. The table also may contain a series of addresses to provide jump chains associated with one or more of the multiple navigational buttons linking together selected tracks with the navigational buttons. The navigational buttons thus affect the player device selection of video tracks through format information added to frames of the disc.

Additional objects and advantages of the invention will be set forth below with reference to the drawings and the detailed description. It is to be understood that the invention is not limited in its application to the details of the examples provided in the description or illustrated in the drawings. The invention is capable of other embodiments and of being practiced or carried out for a variety of applications and in various ways.

DETAILED DESCRIPTION OF THE PREFERRED EMBODIMENTS

Figure 1A:
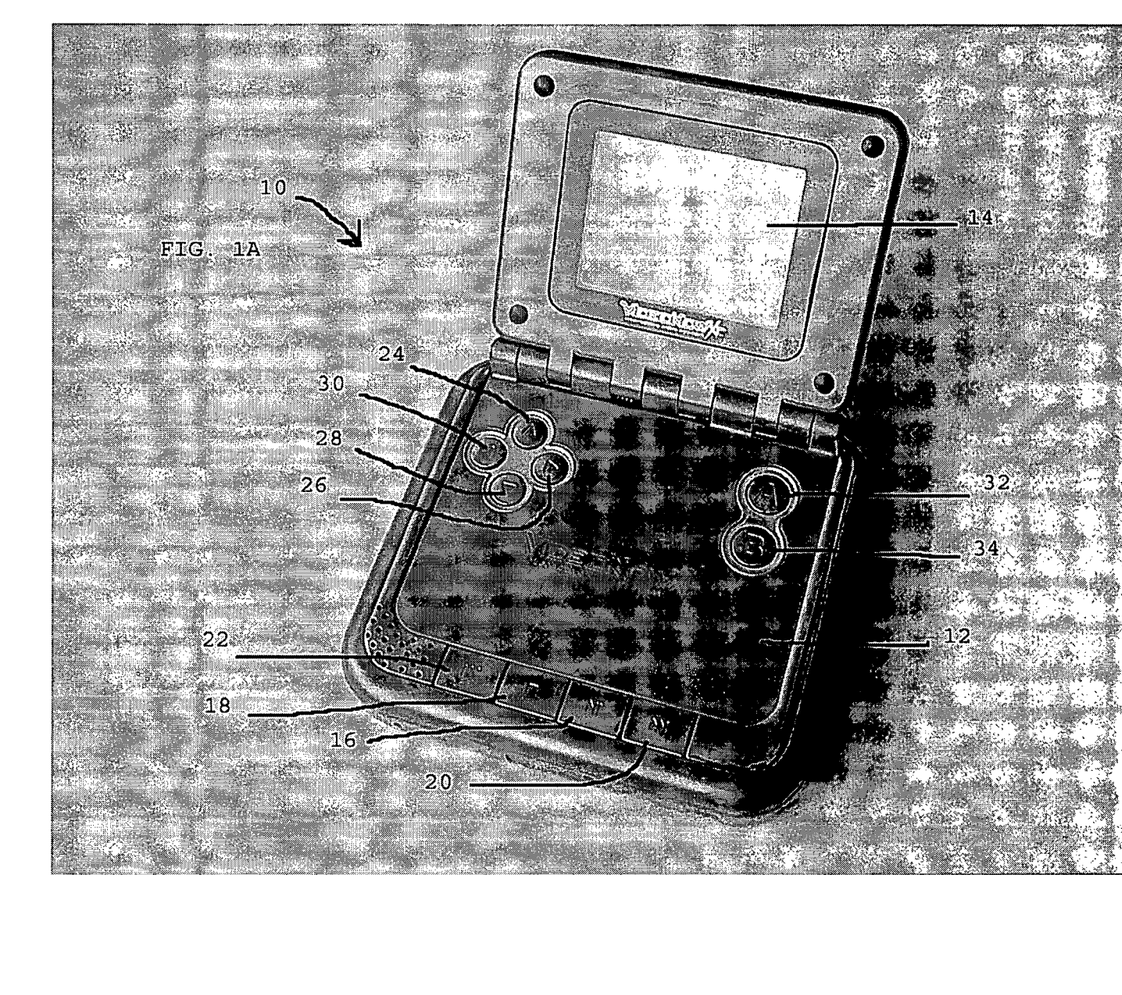
FIGS. 1A and 1B are perspective views of a disc player illustrating both standard and advanced navigational buttons.
Figure 2:
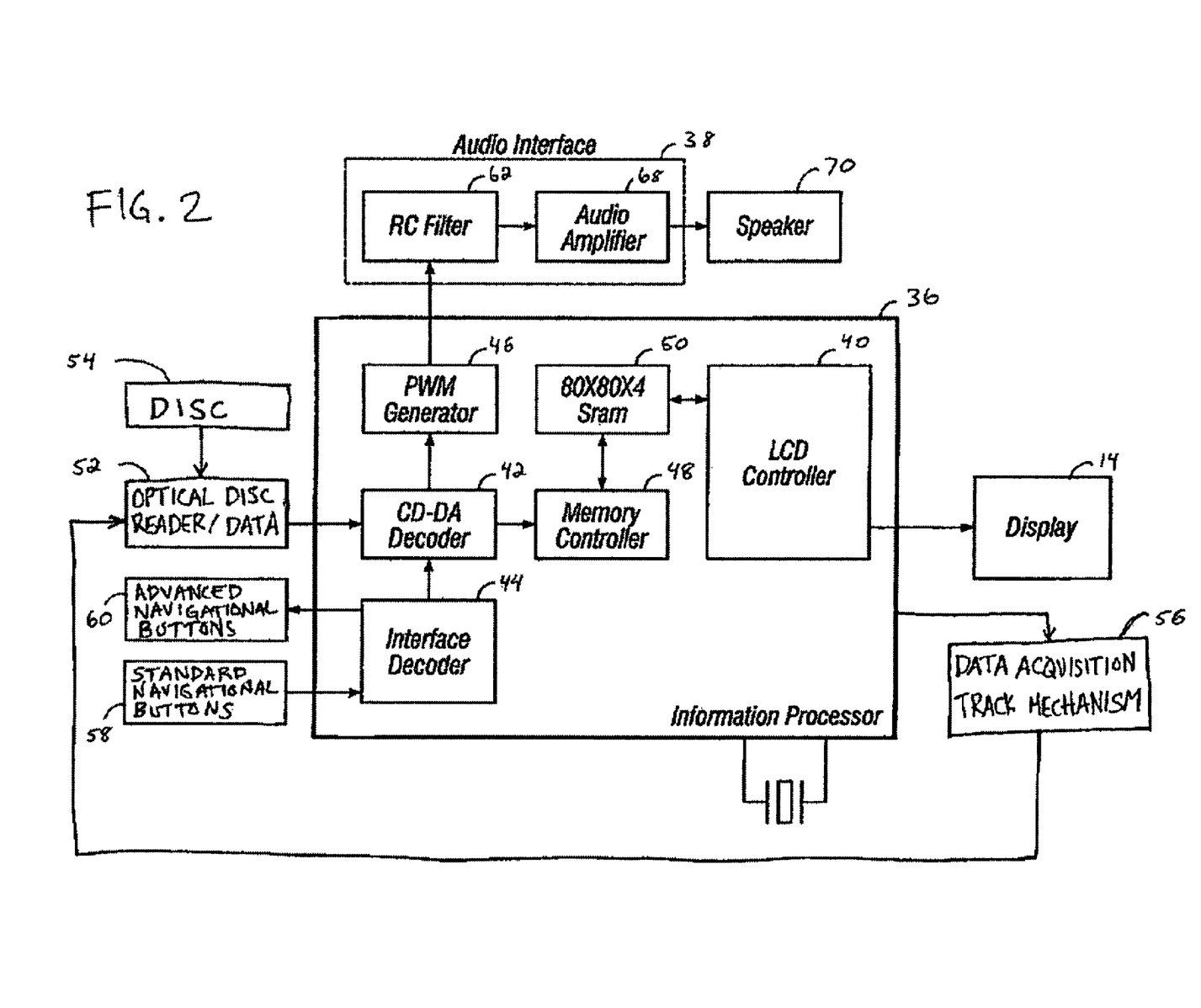
FIG. 2 illustrates components associated with an information processor according to one embodiment of the invention.

A disc player 10, as shown in FIG. 1A, for interactive video display uses compact discs encoded with content information and format information combining "DVD style" gaming applications with high quality video images. The disc player 10 includes a housing 12 for receiving a disc, a display window 14 for viewing images, and standard and advanced navigational buttons for user input. The display window also includes a transparent portion for viewing a video display located adjacent the window 14 as described below. In some embodiments and as seen in FIG. 1A, user input buttons may include a Play/Pause button 16, Stop button 18, Next button/FF 20, and Previous button/FR 22 (collectively named standard navigational buttons 58, as seen in FIG. 2). Additionally, user input buttons may also include an UP button 24, RIGHT button 26, DOWN button 28, LEFT button 30, A button 32, and B button 34 (collectively named advanced navigational buttons 60, as seen in FIG. 2). Functions associated with these user input buttons are described in subsequent paragraphs.

An information processor 36 is illustrated in FIG. 2 with an audio interface 38, and a video interface 40. The information processor 36 may also include a data decoder 42, an interface decoder 44, a pulse width modulation ("PWM") generator 46, a memory controller 48, and data storage device or memory 50. Preprocessing such as filtering and amplification may be applied to the information before it is received by the data decoder 42. The data decoder 42 accepts the information decodes the video, audio and format information. The audio information may be decoded having 8-bit quantization. The memory controller 48 is coupled to the decoder 42 and accepts the decoded video information. The memory controller 48 routes the information to the memory 50 at a rate corresponding to a desired frame rate. The memory 50 is illustrated as being random access memory ("RAM"), however, other types of volatile and non-volatile memory may be implemented for use with the device 10. The memory 50 receives the video information, or signal, and stores the information for output to the video interface 40. The video interface 40 accesses the information stored in the memory 50 and outputs the data to the display unit 14.

In one embodiment, an optical disc reader 52 extracts information from a recordable medium, seen as a disc 54 in FIG. 2, for processing by the information processor 36. The optical disc reader 52 extracts both content and format information from the disc 54. The information processor 36 is operable with the display 14 for generating images on the display, and is also operable with a data acquisition track mechanism 56 capable of positioning the optical disc reader 52 at a selected track on the disc 54, and processing the signal from the optical disc reader 52. In some embodiments, the Play/Pause button 16 is operable to cause the optical disc reader 52 to play or pause the reproduction of audio and video information, and the Stop button 18 is operable to cause the optical disc reader 52 to stop operation. The Next/FF button 20 and Previous/FR button 22 are operable to cause the optical disc reader 52 to fast-forward, or skip, to the next stored content and fast-reverse to the previously stored content, respectively. In some embodiments, some or all of the advanced navigational buttons 60 are operable to cause the data acquisition track mechanism 56 to position the optical disc reader 52 at a selected track on the disc 54, and will be discussed in detail below.

The compact discs 54 of the present invention utilized by the disc player 10, are standard digital audio CDs ("CD-DA") encoded with frame data structures containing content information and format information on a plurality of tracks on the disc. The content information is configured to contain both video and audio data, rather than only audio data common on standard digital audio CD's. The track structure of the compact disc is the same as standard audio CDs comprising one extended spiral of data divided into up to ninety-nine tracks. Unlike most streaming media, audio and video are not stored as separate streams, so audio and video cannot get out of sync during playback. Audio and video are then mixed together in a single stream and this mixing happens at a very fine level. There are many samples of audio for every frame of video in the combined stream.

In some embodiments, the audio information is sampled as a 44.1 kHz, 8-bit, monaural signal. The PWM generator 46 is operable to convert the 8-bit audio information into a PWM signal. This PWM signal may then be output to the audio interface 38. In the exemplary illustration, the audio interface 38 includes a filter 62 and an amplifier 68, although may include more or fewer components including transistors. The audio interface 38 is operable to receive the audio information, or signal, from the information processor 36 and provide additional filtering and signal amplification. In another embodiment, the audio interface is optional and the audio signal is output to a speaker 70 directly from the PWM generator 46. In one embodiment, the volume control is coupled to the audio interface 38 and operable to cause a variance in the amount of signal amplification. The signal output from the audio interface 38 may be received by either or both the speaker 70 and another device, such as headphones, coupled to the audio jack.

Figure 1B:
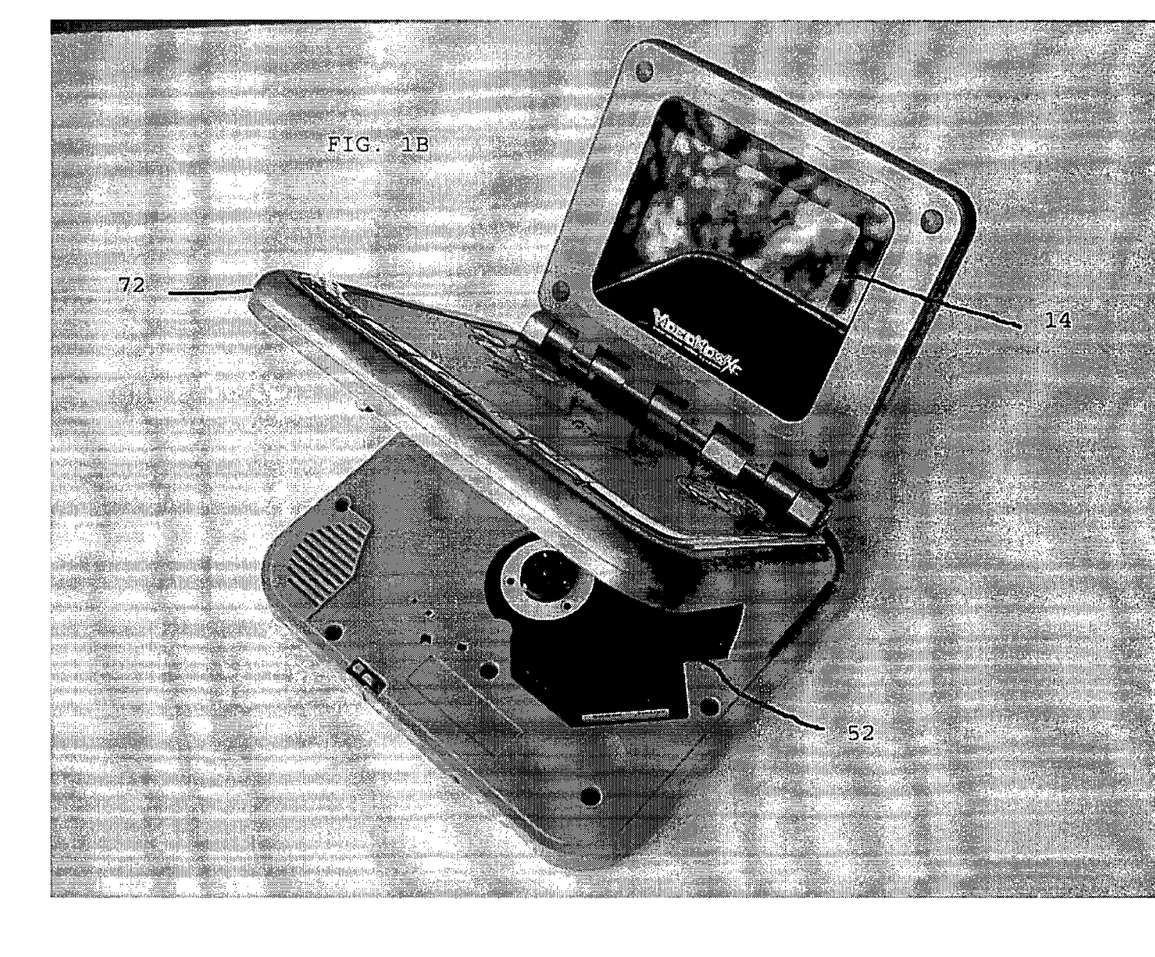

As discussed above, the compact discs 54 are encoded with frame data structures containing format information as well as content information on a plurality of tracks on the disc. In some embodiments, every frame data structure of every track on the disc may contain format information which comprises technical data, some of which is used to manipulate tracks on the disc by the disc player 10 in accordance with user input. Selected portions of the format information from at least one frame data structure of at least one track on the disc comprises a table containing address information associating at least one of the plurality of advanced navigational buttons 60 with a track on the disc. The address information includes a series of addresses which may provide a jump chain defined by the table. The series of addresses repeatedly update a series of registers located on the disc player 10 as the disc is played. Encoding two or more frame data structures, instead of only one from each track, with identical address information can ensure the accuracy of the updating of the registers of the disc player. In some embodiments, the series of addresses which are uploaded to the series of registers can be unique to each one of the plurality of tracks on the disc and can be predetermined to provide jump chains associated with the multiple advanced navigational buttons 60 for interactive game play. Depending on how a game is to be played, some or all six advanced navigational buttons 60, as shown in FIG. 1, can be associated with a track on the disc, even linking together two or more selected tracks to the multiple advanced navigational buttons 60.

In an embodiment, the table may be programmed either by a serial bus connection or by the data decoder 42 that decodes the table stored on the disc. A gamma correction table may be included to augment image scale parameters associated with the data, and further include data structures exemplified in table and register format TABLES 1-6 below. A method of formatting information on a disc for playback responsive to user navigational inputs includes the steps of encoding frame data structures on a plurality of tracks on the disc, and providing content and format information in the frame data structures. The content information in the frame data structures is for the display of images associated with at least one of the plurality of tracks on the disc. The format information in the frame data structures define jump chains associated with at least one of the user navigational inputs to select at least one of the plurality of track on the disc. The format information includes tables containing a series of addresses associating two or more navigational inputs with a track on the disc. The address information is repeatedly updated to a series of registers on the disc player during playback of the disc.

Additionally, security features may include reading the TOC (Table of Contents) and storing a gamma correction table for the disc in the SOF (Start of Frame) section to determine, e.g., the content for the disc and duration of play in minutes, disc size such as distinguishing between 80 mm, 85 mm, 108 mm, 120 mm discs. Accordingly, there may be a dummy track included at the end of the disc that is ignored by navigation and is not played, but can be used to pad the disc, e.g., to be more than 30 minutes. The disc player 10 would then be programmed to disallow the playback of any disc that is less than 30 minutes long.

Various other types of technical data may be included in the format information of the frame data structures of various tracks on the disc, including track type flag data and time window data. Track type flags allow special behaviors, such as a "correct answer" flag which causes the score to a game to increase when the track is played and a "pause" flag which directs the disc player to play the current track and then pause on the last frame of the track until the user activates a navigational button. Time window data, as explained further below, provides for a jump chain that can change as a current track plays and requires time-limited input from the user to signal a jump to a designated track. It is also contemplated that other types of technical data can be included in the format information of some or every frame data structures of the tracks of the disc.

In operation, the optical disc reader 52 of the disc player 10 is operable to read the time-synchronized interleaved audio and video information recorded on the CD-DA, and the data acquisition track mechanism 56 is operable to process a signal representative thereof to the information processor 36. The processor extracts the audio and video information from the interleaved stereo audio channels and provides an audio signal and video signal to respective audio and video interfaces for reproduction by a speaker and a display 14. The user may operate the disc player 10 by pivoting open a media cover portion 72, inserting a CD-DA formatted as described above, closing the media cover portion 72, and initiating one or more of the control means on the device, such as standard navigational buttons 58 and advanced navigational buttons 60. In some embodiments, the Advanced navigational buttons 24, 26, 28, & 30 can be included as a cluster of four separate buttons as seen in FIG. 1A, or alternatively as a D-pad, indicating UP, RIGHT, DOWN, and LEFT.

As the disc is played, the track order selection begins at track 1 of the CD-DA and plays through in order to the end-of-disc track, or until user input alters the order in which the tracks are played. For example, a typical track order of a CD-DA includes the following:

EXAMPLE 1

Tracks 1 Through 11

1. Logo track
2. Thumbnail 1 track
3. Thumbnail 2 track
4. Episode 1 track
5. Episode 2 track
6. Episode 3 track
7. Episode 4 track
8. Promo 1 track
9. Promo 2 track
10. End-of-disc track
11. Dummy track After the Logo track is played, the information processor 36, as seen in FIG. 2, directs the data acquisition track mechanism 56 to move the optical disc reader 52 to the next sequential track, called track 2 (Thumbnail 1 track) which is then played and a corresponding image is generated on the display 14. Additionally, when track 2 is played, selected portions of its format information from two or more frame data structures in a row update the disc player's registers with an identical series of addresses associating some or all of the multiple advanced navigational buttons 60 with a track on the disc. Upon activation of one of the associated navigational buttons 60, the information processor 36 directs the data acquisition track mechanism 56 to navigate the optical disc reader 52 to the track, or series of tracks on the disc, associated with the activated navigational button 60. As describe above, the disc player can easily and quickly jump from a current track to another designated track, or series of tracks on the disc, upon input from the user via activation of a navigational button.

In some embodiments, tracks of the disc are segregated into different types, as seen in TABLE 1 below, with frame data structures identifying it type such as "Pause" track type 2, "Jump to score" track type 3, "correct" and "wrong answer" tracks types 4 & 5, etc., which are each programmed to play and operate in various ways. "Gaming" tracks are defined as all the tracks between "End of Disc" track and the "Dummy" track. During playback of a "gaming" track, standard navigational buttons 58 should not be functional, and the TRACK_END_JUMP functionality works only for gaming tracks and not other track types, as seen in TABLE 1 below. This information in the table is generally used to instruct the player on which track of the CD-DA to play or jump to after the end of a previous track, or after input from the user via the advanced navigational buttons 60, achieving "DVD style gaming" applications even including some basic fast-action gaming, using just two methods, jump chains and time windows. The gaming of the present embodiment is described as DVD style gaming, rather than "twitch game" style because the games are essentially interactive movies relying on strategy and timing to effect the outcome of the game, and not relying on quick sequential reactions and the speed at which a user presses the buttons or moves the mouse as in "twitch games".

The registers used by the information processor can be defined and described as follows:

TABLE 1

| REGISTER NAME | DESCRIPTION |
| --- | --- |
| FRAME_NUM_0 | The least significant byte of the current frame number. The frame number starts at 00, not 01. |
| FRAME_NUM_1 | The most significant byte of the current frame number. The two-byte frame count can hold up to 65536 frames, or 60 minutes at 18 fps. |
| TRACK_TYPE | 0 = first generation format |
| | 1 = second generation format |
| | 2 = second generation format, go into PAUSE mode on last frame |
| | 3 = second generation format, "Jump-To-Score" track |
| | 4 = second generation format, "Correct Answer" track. Add 1 to SCORE. |
| | 5 = second generation format, "Wrong Answer" track. Subtract 1 from SCORE. |
| | 6 = second generation format, "Reset Score" track. Set score back to 100. |

TABLE 1-continued

| REGISTER NAME | DESCRIPTION |
| --- | --- |
| | (these track types are explained further in the examples below) |
| END_OF_DISC | This register is only valid for track #2 (the first track that is played after the logo track). This register contains the track number of the "End-of-disc" track. This tells the player in the very beginning where the "End-of-disc" track is, so that it knows which tracks to avoid when using the Standard (FF & FR) buttons. For all other tracks besides track #2, this register needs to be set to 0. |
| FRAME_CNT_0 | The least significant byte of the number of frames in this track. |
| FRAME_CNT_1 | The most significant byte of the number of frames in this track. The two-byte frame count can hold up to 65536 frames, or 60 minutes at 18 fps. The frame count is used by the ASIC to pause on the last frame of the track if the TRACK_TYPE is type 2. |

All of the registers from here down are the "Navigational Registers" and contain track numbers on the disc.
The track number is represented in hex, and the valid range is from 2-63 (2-99 decimal).
Track 1 is invalid because it's the logo track.
Any track number equal to or larger than the dummy track is also invalid.
Any invalid track number in these registers should be treated like a 0.

| REGISTER NAME | DESCRIPTION |
| --- | --- |
| TRACK_END_JUMP | If the track is played all the way to the end, the player should jump to the track indicated by this register. If the TRACK_TYPE is 2, the player ignores this register, and goes into PAUSE mode. Also, if the current track is part of a Jump Chain, then this register is ignored until the player is playing the last track in the Jump Chain. Also, if this register is set to 0, then the player will simply play the next track in the track order. This TRACK_END_JUMP register is ignored unless the track is a Gaming Track (see Gaming Track section below). |
| UP_0 | If the UP navigational button is pressed anytime during the playback of this track, the player will navigate to the track number in this register. If this register is 0 (or invalid), then the player can ignore the UP button press (just continue playing the current track). It can also ignore the UP_1, UP_2, and UP_3, registers. If UP_0 is a valid non-zero track number, the player will immediately jump to the beginning of this UP_0 track and play all the way to the end. |
| UP_1 | Once the player is done playing the UP_0 track, it will then play this UP_1 track. If this UP_1 register is 0, then the player will simply continue playing the next track in the Track Order (usually UP_0 + 1 - see Track Order section). If this UP_1 register is 0 (or invalid), then the player can ignore the UP_2 and UP_3 registers. |
| UP_2 | Once the player is done playing the UP_1 track, it will then play this UP_2 track. If this UP_2 register is 0, then the player will simply continue playing the next track in the Track Order (usually UP_1 + 1 - see Track Order section). If this UP_2 register is 0 (or invalid), then the player can ignore the UP_3 register. |
| UP_3 | Once the player is done playing the UP_2 track, it will then play this UP_3 track. If this UP_3 register is 0, then the player will simply continue playing the next track in the Track Order (usually UP_2 + 1 - see Track Order section). |
| RIGHT_0 | Same as UP_0, but for the RIGHT button. |
| RIGHT_1 | Same as UP_1, but for the RIGHT button. |
| RIGHT_2 | Same as UP_2, but for the RIGHT button. |
| RIGHT_3 | Same as UP_3, but for the RIGHT button. |
| : | : |
| : | : |
| TRACK_NUM | The track number of this track on the disc. The logo track is track 01, and goes up sequentially from there. |

The four registers $UP\_0$, $UP\_1$, $UP\_2$, and $UP\_3$ are an example of a "jump chain". The jump chain includes the four registers in this order: $XXX\_0 \rightarrow XXX\_1 \rightarrow XXX\_2 \rightarrow XXX\_3$, wherein XXX corresponds to any one of the navigational buttons including UP, RIGHT, DOWN, LEFT, and A or B buttons. The jump chain can be anywhere from 0 to 4 tracks, and a value of '0' in the jump chain signifies the end of the jump chain. Jump chain Tables 2 and 3 are seen below:

TABLE 2

Jump Chain of 0 tracks:

| REGISTER | VALUE |
|---|---|
| UP_0 | 0 |
| UP_1 | 0 |
| UP_2 | 0 |
| UP_3 | 0 |

TABLE 3

Jump Chain of 3 tracks:

| REGISTER | VALUE |
|---|---|
| UP_0 | 4 |
| UP_1 | 6 |
| UP_2 | 7 |
| UP_3 | 0 |

In jump chain Table 2, the four registers assigned to the UP navigational button have all been updated with a zero address value, and the UP navigational button has been made non-functional. This means that during playback of the current track, no tracks are associated with this UP navigational button and the current track will play uninterrupted by activation of the UP navigational button. On the other hand, in jump chain Table 3, three of the four registers assigned to the UP navigational button have non-zero valid address values. This means that during playback of the current track, activation of the UP navigational button will jump playback from the current track to the series of tracks 4, 6, & 7 in that order. Referring to Example 1 which corresponds to the sample track order, it can be seen that activation of the UP navigational button as in example 4, will jump playback from the current track 2 to the series of episode tracks 4, 6 & 7 in that order.

Figure 3A:
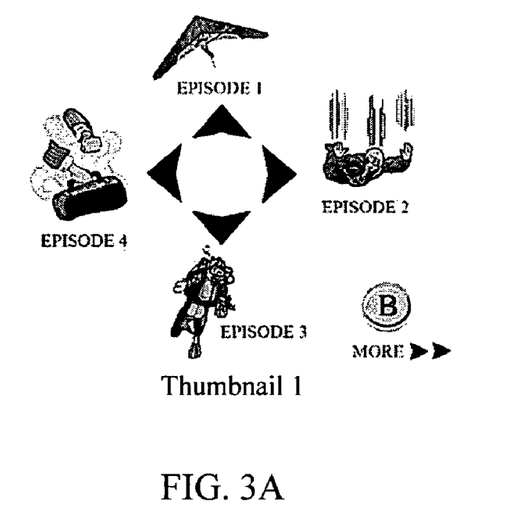
FIGS. 3A and 3B are sample menu screens illustrating Thumbnail 1 and 2 tracks of Example 5.

Another example, utilizing the track order as defined in Example 1 above, illustrates Thumbnail tracks and how they can be simply defined to operate like a menu on a DVD player. The advanced navigational buttons use only single jumps, indicated by the $XXX\_1$, $XXX\_2$, $XXX\_3$ registers always set to 0, so the jump chain includes only one track. For example, track 2 (Thumbnail 1 track) is played after track 1 (logo track) and an image is generated on the display as seen in FIG. 3A. While track 2 (Thumbnail 1 track) is played, the following series of address values would update the disc player's registers as seen in TABLE 4 below:

TABLE 4

| REGISTER | VALUE |
|---|---|
| FRAME_NUM_0 | 0 |
| FRAME_NUM_1 | 0 |
| TRACK_TYPE | 2 |
| END_OF_DISC | 10 |

TABLE 4-continued

| REGISTER | VALUE |
|---|---|
| FRAME_CNT_0 | 56 |
| FRAME_CNT_1 | 0 |
| TRACK_END_JUMP | 3 |
| UP_0 | 4 |
| UP_1 | 0 |
| UP_2 | 0 |
| UP_3 | 0 |
| RIGHT_0 | 5 |
| RIGHT_1 | 0 |
| RIGHT_2 | 0 |
| RIGHT_3 | 0 |
| DOWN_0 | 6 |
| DOWN_1 | 0 |
| DOWN_2 | 0 |
| DOWN_3 | 0 |
| LEFT_0 | 7 |
| LEFT_1 | 0 |
| LEFT_2 | 0 |
| LEFT_3 | 0 |
| A_0 | 0 |
| A_1 | 0 |
| A_2 | 0 |
| A_3 | 0 |
| B_0 | 3 |
| B_1 | 0 |
| B_2 | 0 |
| B_3 | 0 |
| TRACK_NUM | 2 |

$FRAME\_NUM\_0$ has a value of 0 indicating that this is the very first frame of the track. The TRACK_TYPE value of 2 indicates that this is a second generation format track, and that the player goes into PAUSE mode on the last frame of the track and waits for user input via either the Standard Navigational buttons or the Advanced Navigational buttons. This programming technique saves space on the disc, allowing pausing without taking up space on the disc with null frames, thus allowing the disc player to respond as if the user has pressed the PAUSE button after the last frame on the track. The END_OF_DISC value is 10 telling the player that the "End-of-disc" track is track #10. Since this track is track #2 on the disc, it needs to have this END_OF_DISC register set. The $FRAME\_CNT\_1$ value is 0 and $FRAME\_CNT\_0$ value is 56 indicating that there are 56 frames in this track. The TRACK_END_JUMP register is indicating the next track #3 (Thumbnail 2) but it will be ignored since the TRACK_TYPE is 2, and the player goes into PAUSE mode at the end of the current track. The TRACK_NUM value is 2 indicating that this is track 2 on the disc.

The remaining registers and address values correspond to the six advanced navigational buttons associating some of the buttons with a track on the disc, and designating other navigational buttons as non-functional. The $UP\_0$ value is 4 and $UP\_1$ value is 0 indicates that whenever the UP button is pressed during the playback of this track or when it's in PAUSE mode on the last frame, the disc player will simply jump directly to track #4 (Episode 1 as seen in FIG. 3A). The $RIGHT\_0$, $DOWN\_0$, $LEFT\_0$ values are 5, 6 & 7 respectfully, indicating that whenever the RIGHT, DOWN, or LEFT buttons are pressed during playback of this current track or when this current track is in PAUSE mode on the last frame, the disc player will jump directly to track numbers 5, 6 & 7 (Episodes 2, 3 & 4 as seen in FIG. 3A) respectfully. The $A\_0$ value of 0 means that the A button is non-functional or ignored during this track. The $B\_0$ value of 3 and $B\_1$ value of 0 indicates that whenever the B button is pressed during the playback of this track or when it's in PAUSE mode on the last frame, the disc player will jump to track 3 (Thumbnail 2 as seen in FIG. 3A).

Figure 3B:
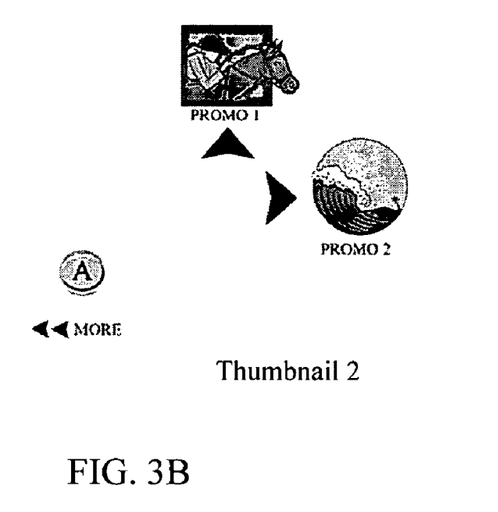

In order to be able to direct the player to jump to additional tracks in the same menu style, namely remaining tracks number 8 (Promo 1 track, as seen in FIG. 3B) and number 9 (Promo 2 track, as seen in FIG. 3B) a Thumbnail 2 track is employed which is defined to operate similarly to Thumbnail 1 track, and is seen in FIG. 3B. Track 3 (Thumbnail 2 track) would have navigational register address settings mostly set to zero, like Thumbnail 1 track, except UP$_{-0}$ value set to 8, and RIGHT$_{-0}$ value set to 9 indicating that whenever these buttons are pressed during playback or PAUSE mode of track number 3, the disc player will jump to tracks 8 & 9 respectfully. Additionally, the A$_{-0}$ value is set to 2, directing the disc player back to track 2 (Thumbnail 1 track, as seen in FIG. 3B) during playback or PAUSE mode of track 3.

A wide variety of game designs are possible employing the same and similar mechanisms as described above. DVD style gaming applications can also be employed through these mechanisms providing a gaming feature which makes use of multiple jumps utilizing some or all of the six navigational buttons and their corresponding registers. The game designs can be divided up into two major categories, namely turn-based games and action games. Examples of both types are shown below. For example, a turn based game, or trivia style game can be chosen on a DVD style menu, with such a menu operating like the menu described above, and a question-and-answer game would follow. A question-and-answer game as seen in EXAMPLE 2 below, comprising just three questions in the game and adding five new tracks, namely Question tracks 1-3, Correct Answer track, and Wrong Answer track, to those outlined in EXAMPLE 1 above.

EXAMPLE 2

Figure 4:
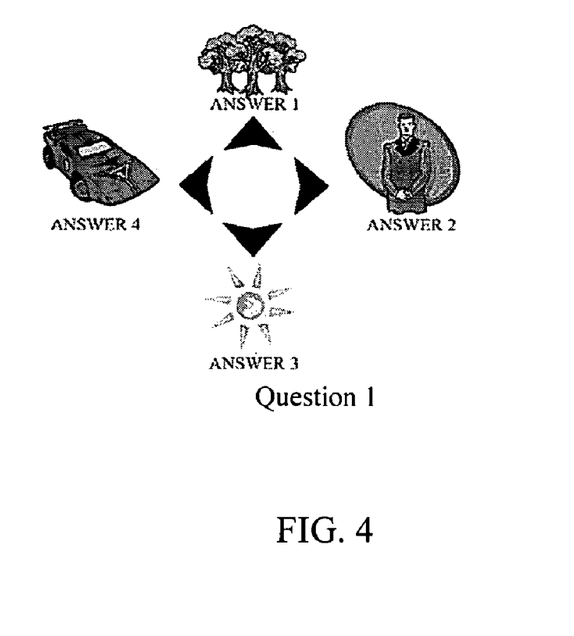
FIG. 4 is a sample question-and-answer screen illustrating Question 1 track of Example 7.

1. Logo track
2. Thumbnail 1 track
3. Thumbnail 2 track
4. Episode 1 track
5. Episode 2 track
6. Episode 3 track
7. Episode 4 track
8. Promo 1 track
9. Promo 2 track
10. End-of-disc track
11. Question 1 track
12. Question 2 track
13. Question 3 track
14. Correct Answer track
15. Wrong Answer track
16. Dummy track As the game begins, track 11 (Question 1 track) is played sequentially after track 10 and an image is generated on the display as seen in FIG. 4. Track 11 has TRACK_TYPE 2 address designation which is updated to the player's registers directing the disc player to go into PAUSE mode on the last frame of the track as seen in FIG. 4. This last frame has all of the answer options and waits for user input via one of four advanced navigational buttons. While track 11 is played, the following series of address values would update the disc player's registers as seen in TABLE 5 below:

TABLE 5

| REGISTER | VALUE |
|---|---|
| FRAME_NUM_0 | 0 |
| FRAME_NUM_1 | 0 |
| TRACK_TYPE | 2 |
| END_OF_DISC | 0 |
| FRAME_CNT_0 | 23 |
| FRAME_CNT_1 | 0 |
| TRACK_END_JUMP | 0 |
| UP_0 | 15 |
| UP_1 | 12 |
| UP_2 | 0 |
| UP_3 | 0 |
| RIGHT_0 | 15 |
| RIGHT_1 | 12 |
| RIGHT_2 | 0 |
| RIGHT_3 | 0 |
| DOWN_0 | 14 |
| DOWN_1 | 12 |
| DOWN_2 | 0 |
| DOWN_3 | 0 |
| LEFT_0 | 15 |
| LEFT_1 | 12 |
| LEFT_2 | 0 |
| LEFT_3 | 0 |
| A_0 | 2 |
| A_1 | 0 |
| A_2 | 0 |
| A_3 | 0 |
| B_0 | 0 |
| B_1 | 0 |
| B_2 | 0 |
| B_3 | 0 |
| TRACK_NUM | 11 |

Additionally, as track 11 (Question 1 track) video plays, the audio in the track asks a question, and the last frame of the track pauses for an answer as seen in FIG. 4. The user has the option to select "Answer 1, 2, 3 or 4, by pressing the UP, RIGHT, DOWN, or LEFT navigational buttons respectively, as seen in FIG. 4. If the user selects "Answer 1, 2 or 4, corresponding to UP, RIGHT, and LEFT navigational buttons, the disc player will jump to playback of track 15 (Wrong Answer track) and immediately jump to playback of track 12 (Question 2 track). As seen in Example 7, as track 11 plays the UP$_{-0}$, RIGHT$_{-0}$, and LEFT$_{-0}$, registers are all updated with an address value of 15 (indicating track 15) and the UP$_{-1}$, RIGHT$_{-1}$, and LEFT$_{-1}$ registers are all updated with an address value of 12 (indicating track 12). As is also seen in TABLE 5, when the XXX$_{-0}$ and XXX$_{-1}$ registers are non-zero, the disc player performs a multiple Jump demonstrating a "DVD style gaming" application.

Likewise, to get to the correct answer in the game, the user must press the DOWN navigational button, which jumps playback to track 14 (Correct Answer track) followed immediately by track 12 (Question 2 track). As is also seen in the TABLE 5, as track 11 plays the DOWN$_{-0}$ register is updated with an address value of 14 (indicating track 14) and the DOWN$_{-1}$ register is updated with an address value of 12 (indicating track 12). It is important to note that during playback of a jump chain with multiple jumps, as described, the advanced navigational buttons (UP, RIGHT, DOWN, LEFT, A, or B) as well as the standard navigational buttons (FF and FR) are not functional and are ignored by the player until the last frame of the last valid track in the jump chain is played. Additionally as seen in TABLE 5, during playback of track 11 (Question 1 track) if the A button is pressed, the disc player jumps to track 2 (Thumbnail 1 track) and the B button is ignored, since the B$_{-0}$ register is set to 0.

Figure 5:
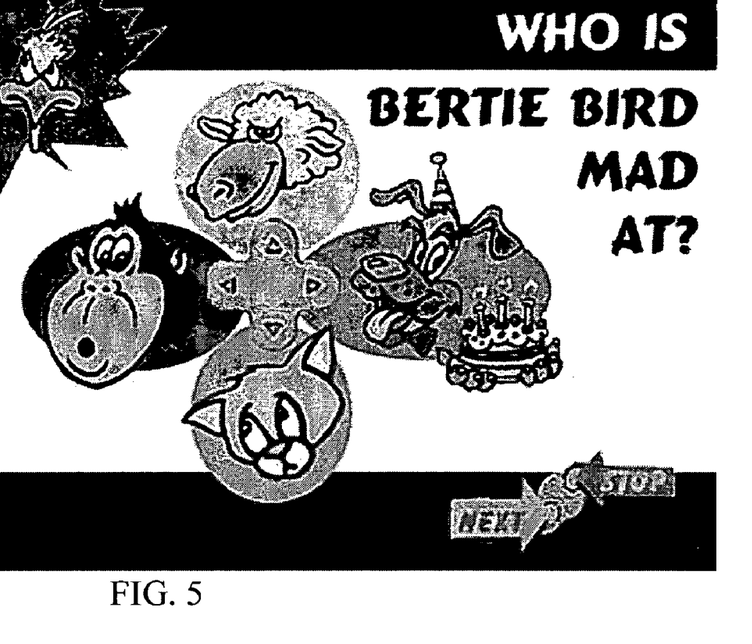
FIG. 5 illustrates a sample trivia screen.

As seen in FIG. 5, a trivia game can feature questions custom written from a video clip on the disc. For example, if the show was about a character named Bertie Bird, one trivia question might be "Who Was Bertie Bird mad at?" If the user then chooses the correct character, they are rewarded by seeing the video clip from the episode. If the user answers incorrectly, then it will play a short, canned INCORRECT video clip and sound effect, and then go back to the same question. This goes on until the user answers all questions, or selects to leave the gaming section. Although this game is specific to the episode played in the video clip, most of the video art is reusable in multiple games, changing only the question text, voiceovers, and the jump chains. This keeps game development costs reasonable while providing different games on each disc.

Figure 6:
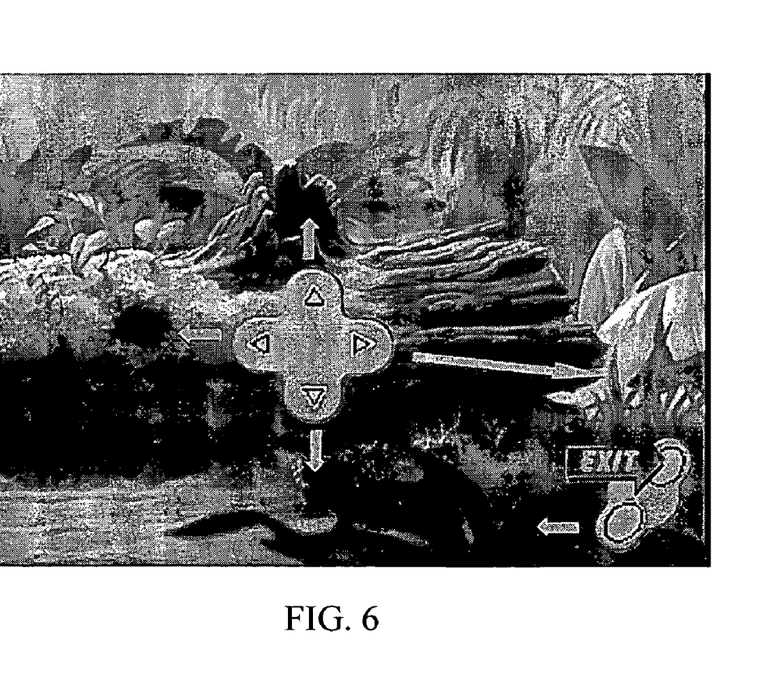
FIG. 6 illustrates a sample of a guessing game screen.

As seen in FIG. 6, a simple guessing game that is good for younger users is shown. This game includes a series of scenes and each scene is a guessing game. Winning each guessing game gives one component of the goal the user is trying to complete, such as "collect all the pieces of the Lost Idol". Each guessing game includes simply choosing a place to look with the user simply guessing each location. When the wrong answer is given, the user is simply told "nice try, try again!" and returned to the screen. Once all the games are won, a reward animation plays "Great job! You've assembled the Lost Idol!"

Figure 7:
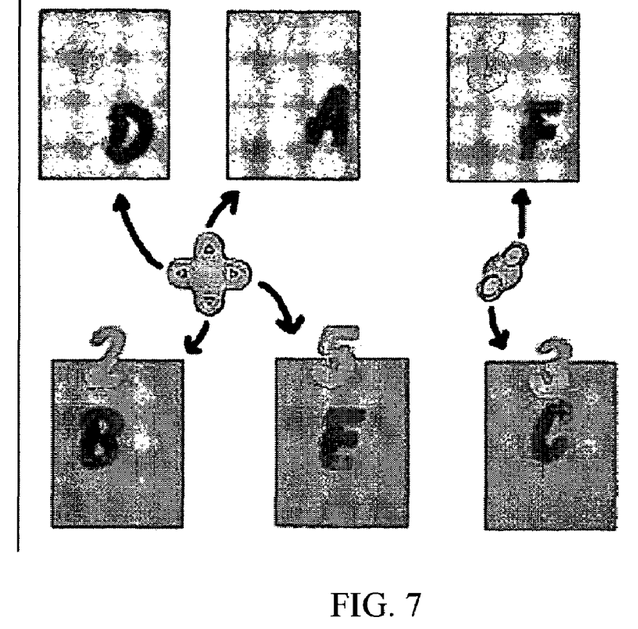
FIG. 7 illustrates a sample of a simple entertainment game screen.

Additionally, as seen in FIG. 7, simple entertainment games for preschool age users is shown. This game requires the user to select the cards in the correct sequence to put them in order, teaching 123's, and ABC's, etc.

A fast paced "DVD style gaming" application can also be achieved through the same mechanisms as defined above, facilitating more animated game play, whereby the jump chains can change dynamically during playback of a track on the disc. It is possible to provide a game wherein the jump chains can change every frame of a track however a user cannot react that quickly to so many changes and there may be a greater possibility of errors during game play. More practically, changes occurring as much as every three frames, corresponding to a maximum of six changes per second for 18 fps speed discs or three changes per second for 9 fps speed discs, would allow for more optimal dynamic game play with, e.g., as much as every three frame data structures of the track dynamically from frame to frame.

As seen in the present invention, at least one track of the disc comprises frame data structures with tables containing a series of addresses which change as much as every three frame data structures of the track creating time windows which occur as much as about every ⅙th of a second as the track is played. A time window is simply a jump chain which is not fixed for the entire track and requires time-limited input from the user during playback of the track. For example, in a "duck hunt" game all the frame data structures of the track have jump chains associated with the "misses track" except when a duck is in the crosshairs, then those frame data structures suddenly associate with the "got it!" reward track. The user is only rewarded when they push the right button at the right time during playback of the track.

Figure 8:
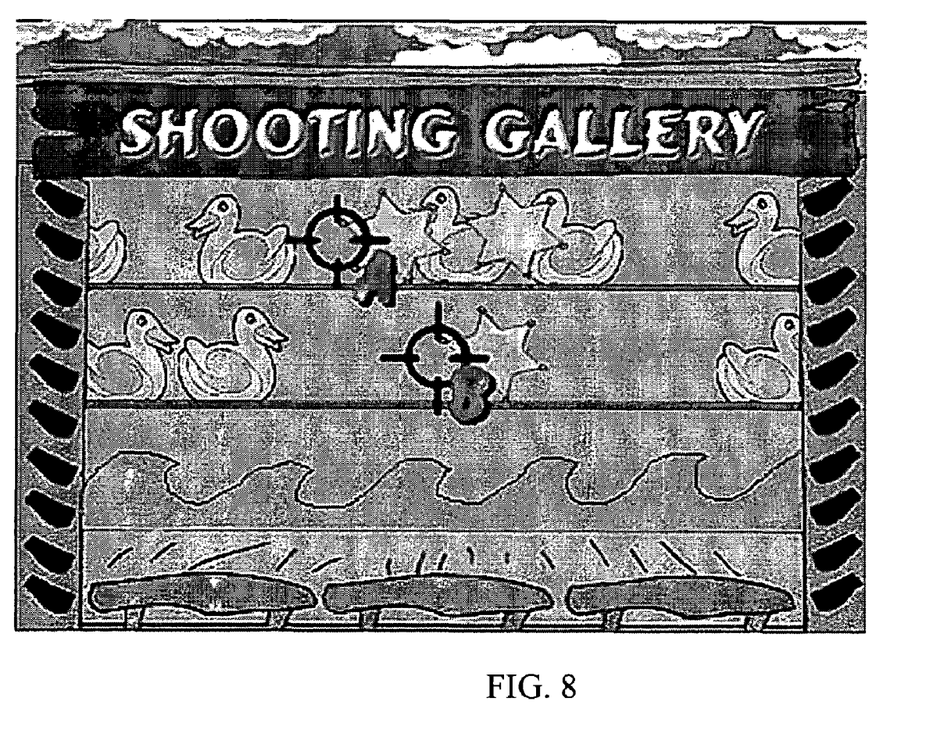
FIG. 8 illustrates a sample of a "shooting gallery" game screen.

As seen in the "Shooting Gallery" screen of FIG. 8, the user waits for targets to pass in front of the crosshairs. The targets don't scroll smoothly; instead they hop along, step by step. Each hop takes about ⅓ of a second. If they push the button when the target hops in front of their crosshairs, they hear a gunshot and the target explodes. If they don't push the right button in time, the game stops and they see a "you lose" animation, and asked if they want to play again.

There are nearly an infinite number of stylistic variations on the shooting gallery game, with the simplest level having a single row of targets (not shown) and the user only having to push one button to play. The next level, as shown in FIG. 8 has two rows of targets with a separate button controlling the shots fired in each row. The user has to watch two rows of targets pass by at once, and this can be very difficult.

Scoring games as they are played can be achieved with a "jump to score" type of track which is another track type with it's own unique TRACK_TYPE register setting entered into frame data structures of the track. This track type is a branching track similar to the tracks described above, however, the branching does not depend on user input as seen with Thumbnail (menu) and gaming track types as described above. During playback of a "jump to score" track all navigational buttons (FF, FR, UP, DOWN, RIGHT, LEFT, A, and B) are ignored, and the next track played at the end of the "jump to score" track, depends on the SCORE register in RAM.

The SCORE register is a working register in RAM that keeps track of how many questions were answered properly. The information processor keeps track of the number of correct and wrong answers based on the number of times the "CORRECT ANSWER" and "WRONG ANSWER" tracks are played. Each of the "CORRECT ANSWER" and "WRONG ANSWER" tracks have a unique TRACK_TYPE register address value encoded in frame data structures of each track, alerting the information processor as to each time either track is played. For accuracy, every time a new disc is inserted, the SCORE register should be initialized to 100 (0×64), and the score should never be allowed to be decremented lower than 0 (0×00) or incremented over 255 (0×FF). In other words, if the score is already at 255 and the user gets one more question right, the score will still stay at 255.

The game can be structured so that the user is returned to the same question every time a wrong answer is given, by encoding both CORRECT ANSWER and WRONG ANSWER tracks. This way, the information processor keeps track of how many times the user got the wrong answer before moving onto the next question. Alternatively, the game can be structured so that the user moves onto the next question whether he/she answers the question right or wrong, and then only the CORRECT ANSWER tracks should be coded using the TRACK_TYPE register. There would still be a WRONG ANSWER track but it would be a TRACK_TYPE 1 instead of TRACK_TYPE 5, so that the score would not be subtracted when you got to this track. Using this method, the information processor keeps track of how many correct answers you had for the fixed number of questions.

EXAMPLE 3 below includes a "Jump-To-Score" type of track, adding four more tracks to EXAMPLE 2, namely Summary, High Score, Med Score, and Low Score tracks as seen below:

EXAMPLE 3

1. Logo track
2. Thumbnail 1 track
3. Thumbnail 2 track
4. Episode 1 track
5. Episode 2 track
6. Episode 3 track
7. Episode 4 track
8. Promo 1 track
9. Promo 2 track
10. Question 1 track
11. Question 2 track
12. Question 3 track 13. End-of-disc track
14. Correct Answer track
15. Wrong Answer track
16. Summary track
17. High Score track
18. Med Score track
19. Low Score track
20. Dummy track During play of EXAMPLE 3, the disc player would take the user through the three questions and then jump to the Summary track. The Summary track (track 16) has a TRACK_TYPE register address value of 3 (see TABLE 6 below) designating it as a "Jump-to-Score" type of track.

In this example, the audio in the Summary track might say something like "OK, let's add up your score!" and the disc player would jump to either the High Score, Med Score, or the Low Score track depending on the current value of the SCORE register, as well as the Navigational Register settings for this "Jump-to-Score" type track.

TABLE 6

| REGISTER | ALT FUNCTION | VALUE |
|---|---|---|
| FRAME_NUM_0 | None | 0 |
| FRAME_NUM_1 | None | 0 |
| TRACK_TYPE | None | 3 |
| END_OF_DISC | None | 0 |
| FRAME_CNT_0 | None | 21 |
| FRAME_CNT_1 | None | 0 |
| TRACK_END_JUMP | None | 0 |
| UP_0 | SCORE_THRESH_A | 103 |
| UP_1 | SCORE_A0 | 17 |
| UP_2 | SCORE_A1 | 2 |
| UP_3 | SCORE_A2 | 0 |
| RIGHT_0 | SCORE_THRESH_B | 102 |
| RIGHT_1 | SCORE_B0 | 18 |
| RIGHT_2 | SCORE_B1 | 2 |
| RIGHT_3 | SCORE_B2 | 0 |
| DOWN_0 | SCORE_THRESH_C | 0 |
| DOWN_1 | SCORE_C0 | 19 |
| DOWN_2 | SCORE_C1 | 2 |
| DOWN_3 | SCORE_C2 | 0 |
| LEFT_0 | SCORE_THRESH_D | 0 |
| LEFT_1 | SCORE_D0 | 0 |
| LEFT_2 | SCORE_D1 | 0 |
| LEFT_3 | SCORE_D2 | 0 |
| A_0 | SCORE_THRESH_E | 0 |
| A_1 | SCORE_E0 | 0 |
| A_2 | SCORE_E1 | 0 |
| A_3 | SCORE_E2 | 0 |
| B_0 | SCORE_THRESH_F | 0 |
| B_1 | SCORE_F0 | 0 |
| B_2 | SCORE_F1 | 0 |
| B_3 | SCORE_F2 | 0 |
| TRACK_NUM | None | 16 |

The TRACK_TYPE 3 ("Jump-to-Score" track) utilizes the Navigational Registers differently than any other TRACK_TYPE. TRACK_TYPE 3 includes an Alternate Function (ALT FUNCTION column above).

During playback of a TRACK_TYPE 3 ("Jump-to-Score") track, the information processor compares the SCORE register value in RAM to the various Score Threshold registers to determine which track to jump to. First, it compares the SCORE register to SCORE_THRESH_A. If SCORE is equal to or bigger than SCORE_THRESH_A, the player will execute the Jump Chain includes: SCORE_A0→SCORE_A1→SCORE_A2.

If the SCORE was less than SCORE_THRESH_A, then it moves down to SCORE_THRESH_B, and so on. Because of this sequencing, the thresholds should be placed in the order of largest to smallest. For example, if all six score thresholds (A-E) are used, the following must be true: SCORE_THRESH_A>SCORE_THRESH_B>SCORE_THRESH_C>SCORE_THRESH D>SCORE_THRESH E. Additionally, the last threshold used should be equal to 0, so as to cover all score possibilities. In EXAMPLE 3 above the three score thresholds are 102, 101, and 0.

Since there are 3 Question tracks in EXAMPLE 3, and the score starts at 100, the possible values for the SCORE register after those 3 Questions (assuming WRONG ANSWER is TRACK_TYPE 1 and not TRACK_TYPE 5), are 100, 101, 102 or 103. Assuming the user's SCORE is 101, when the player gets to the TRACK_TYPE 3 Summary track, it would first compare the SCORE of 101 with the SCORE_THRESH_A value of 103. Since SCORE is smaller, it moves onto SCORE_THRESH_B. The SCORE of 101 is also smaller than SCORE_THRESH_B of 102, so it moves onto SCORE_THRESH_C. Since the SCORE is larger than SCORE_THRESH_C value of 0, it will then execute the Jump Chain includes:

SCORE_C0→SCORE_C1→SCORE_C2

As a result, the disc player plays the multiple jump chain includes first the Low Score track (19) and then jumps to the Thumbnail 1 track (2).

It should be appreciated that a wide range of changes and modifications may be made to the embodiments of the invention as described herein. Thus, it is intended that the foregoing detailed description be regarded as illustrative rather than limiting and that the following claims, including all equivalents, are intended to define the scope of the invention.

What is claimed is:

1. A disc player for interactive image display, comprising:
   a housing for receiving a disc;
   a plurality of navigational buttons on the housing;
   an optical disc reader for reading content information and format information from frame data structures encoded on a plurality of tracks on the disc;
   a display;
   an information processor operable with the display and the optical disc reader for using the content information for generating an image on the display;
   a data acquisition track mechanism for positioning the optical disc reader at a selected one of the plurality of tracks on the disc; and
   a series of registers used by the information processor to store selected portions of the format information from the frame data structures to provide jump chains associated with at least one of the plurality of navigational buttons, the series of registers being used by the information processor to position the data acquisition track mechanism at the selected one of the plurality of tracks.

2. The disc player as recited in claim 1, wherein said selected portions of the format information from at least one of the frame data structures comprises a table containing address information associating at least one of the plurality of navigational buttons to a track on the disc.

3. The disc player as recited in claim 2, wherein said series of registers are located on the disc player and are dynamically updated with table addresses as the disc is played, creating time windows.

4. The disc player as recited in claim 2, wherein said disc player comprises multiple navigational buttons associated with the table.

5. The disc player as recited in claim 3, wherein at least one track of the disc comprises two or more frame data structures having identical address information to ensure the accuracy of the updating of the registers of the disc player.

6. The disc player as recited in claim 2, wherein said address information comprises a series of addresses to provide a jump chain defined by the table.

7. The disc player as recited in claim 2, wherein at least one track of the disc comprises frame data structures with tables containing a series of addresses which change with multiple frame data structures of the track.

8. The disc player as recited in claim 1, further comprising a table contained in the selected portions of the format information from the frame data structures of the tracks on the disc, wherein said table is unique to one of the plurality of tracks on the disc and is stored on the series of registers as said one of the plurality of tracks is read by the optical disc reader.

9. The disc player as recited in claim 8, wherein said table contains a series of addresses which provide jump chains associated with two or more of the multiple navigational buttons linking together two or more selected tracks to each of said two or more multiple navigational buttons.

10. A method of formatting information on a disc for playback responsive to user navigational inputs, the method of formatting comprising:
    encoding frame data structures on a plurality of tracks on the disc;
    providing content information in the frame data structures for the display of images associated with at least one of the plurality of tracks on the disc;
    providing format information in the frame data structures defining jump chains associated with at least one of the user navigational inputs to select at least one of the plurality of tracks on the disc, wherein said format information comprises tables containing address information associating at least one of the user navigational inputs with a track on the disc, and wherein said tables associate two or more of said user navigational inputs with a track on the disc.

11. A method of formatting information on a disc for playback responsive to user navigational inputs, the method of formatting comprising:
    encoding frame data structures on a plurality of tracks on the disc;
    providing content information in the frame data structures for the display of images associated with at least one of the plurality of tracks on the disc;
    providing format information in the frame data structures defining jump chains associated with at least one of the user navigational inputs to select at least one of the plurality of tracks on the disc, wherein said format information comprises tables containing address information associating at least one of the user navigational inputs with a track on the disc, and wherein said address information comprises a series of addresses to provide jump chains defined by the tables.

12. The method as recited in claim 10, wherein said tables comprise a series of addresses which provide jump chains associated with two or more of the user navigational inputs linking together two or more selected tracks to each of said two or more user navigational inputs.

13. The method as recited in claim 10, wherein said address information is repeatedly updated to a series of registers located on a disc player during playback of the disc.

14. The method as recited in claim 13, wherein at least one track of the disc comprises two or more frame data structures having identical address information to ensure the accuracy of the updating of the registers.

15. The method as recited in claim 10, wherein at least one of the plurality of tracks comprises at least one frame data structure providing address information which changes dynamically from frame to frame, creating time windows.

16. The method as recited in claim 10, wherein said format information of the plurality of tracks comprises a table containing a series of addresses unique to one or more of the plurality of tracks on the disc.

17. A disc playing method for selecting one of a plurality of tracks from the disc for displaying images on the disc player, the method comprising:
    providing a plurality of navigational buttons on the disc player;
    encoding frame data structures on a plurality of tracks on the disc;
    providing content information and format information in the frame data structures for the display of images associated with the content information;
    storing the format information from the frame data structures on the disc player in a series of registers used to provide jump chains associated with at least one of the plurality of navigational buttons to select the track from the disc; and
    generating images from the content information of the frame data structures associated with the selected one of the plurality of tracks from the disc.

18. The method as recited in claim 17, wherein said format information further comprises tables containing address information used to repeatedly update the series of registers.

19. The method as recited in claim 18, wherein said address information comprises a series of addresses associating at least one of the plurality of navigational buttons with a track on the disc.

20. The method as recited in claim 19, wherein said series of addresses associate at least one of the plurality of navigational buttons with two or more selected tracks on the disc.

21. The method as recited in claim 18, wherein said address information comprises a series of address to provide at least one jump chain defined by the table.

22. The method as recited in claim 17, wherein at least one track of the disc comprises frame data structures with tables containing a series of address which change dynamically from frame to frame, creating time windows.

23. The method as recited in claim 11, wherein said address information is repeatedly updated to a series of registers located on a disc player during playback of the disc.

24. The method as recited in claim 11, wherein said format information of the plurality of tracks comprises a table containing a series of addresses unique to one or more of the plurality of tracks on the disc.

* * * * *